United States Patent [19]

Forchheim et al.

[11] Patent Number: 4,930,402
[45] Date of Patent: Jun. 5, 1990

[54] HYDRAULIC LIFTING CYLINDER-PISTON UNIT

[75] Inventors: Hans Forchheim, Erdmannsdorf; Matthias Schlieder, Oederan, both of German Democratic Rep.

[73] Assignee: Bauakademie d. Deutschen Dem. Republik, Berlin, German Democratic Rep.

[21] Appl. No.: 201,117

[22] Filed: May 27, 1988

[30] Foreign Application Priority Data

May 28, 1987 [DE] Fed. Rep. of Germany ............ WPF16J/3032306
May 11, 1988 [DE] Fed. Rep. of Germany ....... 3816092

[51] Int. Cl.⁵ ............................................. F15B 11/18
[52] U.S. Cl. ................................... 91/167 R; 91/173; 91/361; 91/511; 91/525; 91/170 R; 92/66
[58] Field of Search ................. 60/591, 593; 91/525, 91/511, 361, 173, 176, 167 R, 170 R; 92/66

[56] References Cited

U.S. PATENT DOCUMENTS

| | | | |
|---|---|---|---|
| 2,416,858 | 3/1947 | Tucker et al. | 91/176 |
| 2,822,878 | 2/1958 | Corson | 91/173 |
| 3,059,433 | 10/1962 | Hirsch | 91/525 |
| 4,098,491 | 7/1978 | Larralde | 91/511 |
| 4,106,390 | 8/1978 | Kodaira | 91/361 |
| 4,523,512 | 6/1985 | Hessel et al. | 91/173 |
| 4,712,467 | 12/1987 | Foster | 91/176 |
| 4,749,936 | 6/1988 | Taplin | 91/361 |

FOREIGN PATENT DOCUMENTS

| | | | |
|---|---|---|---|
| 2321820 | 8/1974 | Fed. Rep. of Germany | 91/173 |
| 2906631 | 9/1980 | Fed. Rep. of Germany | 60/593 |
| 0127108 | 8/1982 | Japan | 91/173 |
| 0163706 | 10/1982 | Japan | 91/173 |
| 0043206 | 3/1984 | Japan | 91/167 R |
| 0588399 | 1/1978 | U.S.S.R. | 60/593 |

Primary Examiner—Robert E. Garrett
Assistant Examiner—Thomas Denion
Attorney, Agent, or Firm—Michael J. Striker

[57] ABSTRACT

A hydraulic cylinder-piston unit comprises primary cylinder-piston unit with an integrated position regulation and with a primary cylinder and a primary piston movable in the primary cylinder, two displacement chambers in the primary cylinder and including two displacement pistons, a displacement piston rod connecting the displacement pistons with one another, and a separating wall, and differential cylinder-piston unit formed by the primary piston and having a differential cylinder provided with working chambers.

3 Claims, 1 Drawing Sheet

HYDRAULIC LIFTING CYLINDER-PISTON UNIT

BACKGROUND OF THE INVENTION

The present invention relates to a hydraulic lifting cylinder-piston unit, for example for leveling fluid-supported loads with stepping movements.

Hydraulic lifting cylinder-piston units of the above mentioned general type are known in the art. A known arrangement includes separately arranged structural groups of cylinder-piston units for a primary stroke, a secondary stroke and a leveling system, with a system of cylinder-piston units for a primary stroke and a secondary stroke as a unit, as well as a separately arranged leveling system.

The disadvantage of this solution is a high dead volume required by pipe and hose connections between the groups of cylinder-piston units and leveling cylinder-piston unit. A differential stroke during the reversing steps reaches up to 20% of the total stroke of the cylinder-piston unit, which for example during movement steps with highly located point of gravity of the load leads to an unfavorable dynamics (swinging motions),or in the event of horizontal arrangement an absolute position constant of the reference plane is not obtained.

A further disadvantage of the known solutions is a high material consumption and manufacturing expenses, as well as a significant space consumption. Also with the known solutions, no variable lifting displacements are possible.

SUMMARY OF THE INVENTION

Accordingly, it is an object of the present invention to provide a hydraulic lifting cylinder-piston unit which avoids the disadvantages of the prior art.

More particularly, it is an object of the present invention to provide a hydraulic cylinder-piston unit which in connection with a hydraulic control system, because of robust and wear-free functional elements with minimal space consumption, realizes opposite movements which guarantee a high positioning constant of the transporting objects to be placed during movement steps.

In keeping with these objects and with others which will become apparent hereinafter, a lifting cylinder-piston unit in accordance with the present invention is provided with the functions of a primary stroke, a secondary stroke and integrated directly acting position regulation with variable lifting displacements, without connecting conduits.

In accordance with a novel feature of the present invention, these objects are achieved in that a primary cylinder-piston unit has an integrated position regulation and in which by displacement pistons, a piston rod and a separating wall displacements chambers are formed, and a piston is formed as a differential cylinder with working chambers.

In accordance with another feature of the present invention, the surface of the face area of the piston. to the cross-sectional area of the differential cylinder, as well as the ratio of the face area of the displacement pistons to the ring shaped surface defined by the separating wall are identical.

Still another feature of the present invention is that the primary cylinder pistons and pistons of the position regulation form a working chamber, whereby an exact position regulation also in the reversal points is achieved.

A further feature of the present invention is that the individual working chambers are connected with a hydraulic control system.

Variable lifting displacements of the structural groups of the cylinders are selectively adjustable by a displacement pickup in connection with an electrohydraulic control.

When the lifting cylinder-piston unit is designed in accordance with the present invention, it possesses the advantages in that with a compact, and space minimizing construction and relative movements of structural groups connected with the cylinder system, a position constant reference plane is obtained.

Depending on a special field of application, variable lifting displacements which are performed by a displacement pickup mounted on the position regulating system are selectively adjustable in connection with the hydraulic control.

The arrangement is robust, operates in an energy-optimal manner and is maintenance free, and also is not subjected to any outside influences It guarantees a high operational safety.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view schematically showing a hydraulic lifting cylinder-piston unit with a hydraulic control on a stepping-sliding system.

DESCRIPTION OF A PREFERRED EMBODIMENT

Figure 1:
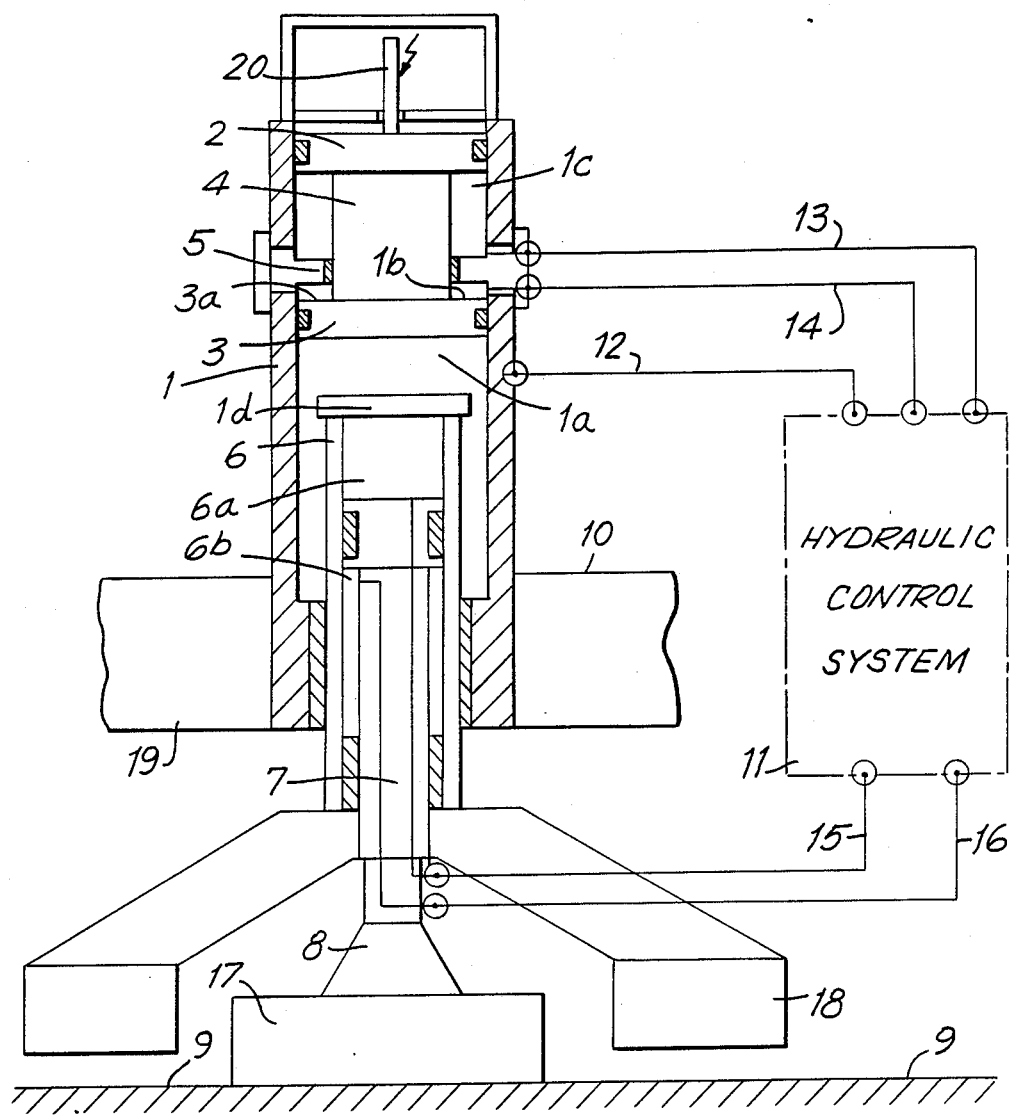

A primary cylinder-piston unit with a position regulating system which acts here as a leveling system carries a load 19. The primary cylinder-piston unit has a cylinder identified with reference numeral 1.

A plunger displaces in the cylinder 1 of the primary cylinder-piston unit and forms a differential cylinder-piston unit. The differential cylinder-piston unit has a cylinder 6 with working chambers 6a and 6b. It is connected via a conduit 12 with a hydraulic control system 11 for taking up a load and for stationary leveling.

A piston rod 7 of the differential cylinder-piston unit has a sliding bearing 8. The leveling system is formed by pistons 2 and 3 which are connected with one another by a piston rod 4, and a separating wall 5.

The ratio of the face area of piston 1d of the primary cylinder-piston unit to cross-sectional area of the cylinder 6 of the differential cylinder-piston unit, as well as the ratio of the face area of the displacement piston 3 to a ring-shaped surface 3a are equal to one another.

The stepping-sliding-movements are performed by the sliding bearing 8, a stepping guide 17 and a stepping traverse 18.

When the load 19 formed for example as a tower-like crane device with highly located point of gravity is moved by the stepping-sliding transporting system, a constant distance between a ground level 9 and a load level 10 must be maintained during the movement steps.

The required volume compensation of the working medium in the position regulating system for performing the opposite movements of the primary cylinder-piston unit and the differential cylinder-piston unit is performed in the following manner.

The hydraulic control system 11 supplies pressure oil through a conduit 13 to a working chamber 1c. As a result of this, the working medium flows from a working chamber 1b into the working chamber 6a of the cylinder 6 of the differential cylinder-piston unit through conduits 14 and 15. Thereby the cylinder 6 of the differential cylinder-piston unit is moved out and takes over via the stepping guide 17 the load 19, and the piston 1d of the primary cylinder-piston unit moves in parallel with the same speed upward. When the stepping traverse 18 takes over the load 19, the working chamber 6b is supplied with the working medium through a conduit 16, the cylinder 6 of the differential cylinder-piston unit moves downward, and the piston rod 7 of the primary cylinder-piston unit moves in. The free stroke of the stepping traverse 18, in other words the distance between the ground level 9 and the lower edge of the stepping traverse 18, can be selected in dependence on the property of the ground through a displacement pickup 20 and thereby permits in condition of flat displacement terrains, high average displacement speeds.

The displacement pickup which is formed as a mechanical plunger arranged on the piston 2 activates one or more mechanical switches and signals the preselected level height for the cylinder structural groups brought in operation.

During the retraction step of the stepping guide 17, it is unloaded. For turning of the stepping-sliding module, the stepping guide 17 is freely lifted. Thereby the working medium flows through the conduit 16 into the working chamber 6b and through the conduit 15 flows from the working chamber 6a back to the tank.

During putting on of the stepping guide 17, the working medium flows through the conduit 15 into the working chamber 6a until the stepping guide 17 and the stepping traverse 18 are at the same level.

This half-open hydraulic system has the advantage that the leakage oil losses in the connected working chambers 1b and 6a are compensated during each lifting step.

With a horizontal application of the lifting cylinder-piston unit, the primary cylinder-piston unit is formed as the differential cylinder-piston unit, whereby during relative movements of the structural groups of the cylinder-piston units, position constant reference plane is obtained.

The position regulation in accordance with the present invention is formed by the parts of the primary cylinder-piston unit 2,3,4,5 and the associated chambers 1a, 1b, 1c, and the parts of the differential cylinder-piston unit 6,7, primary piston 1d, and associated chambers 6a, 6b.

It will be understood that each of the elements described above, or two or more together, may also find a useful application in other types of constructions differing from the types described above.

While the invention has been illustrated and described as embodied in a lifting cylinder-piston unit it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A hydraulic cylinder-piston unit, comprising primary cylinder-piston means with an integrated position regulation and with a primary cylinder and a primary piston movable in said primary cylinder; means forming two displacement chambers in said primary cylinder and including two displacement pistons, a displacement piston rod connecting said displacement pistons with one another, and a separating wall; and differential cylinder-piston means formed by said primary piston and having a differential cylinder provided with working chambers, said primary piston having a first face area, each of said displacement pistons having a second face area, and a ratio of said first face area of said primary piston to a cross-section of said differential cylinder is equal to a ratio of said second face area of each of said displacement pistons to an area of an annular surface formed between each of said displacement pistons and said displacement piston rod.

2. A hydraulic cylinder-piston unit comprising primary cylinder-piston means including a primary cylinder, a primary piston, means forming two displacement chambers in said primary cylinder and including two spaced displacement pistons, a displacement piston rod for fixedly connecting said two spaced displacement pistons with one another for joint displacement thereof, and a circular separating wall, and a further working chamber in said primary cylinder between one of said two displacement pistons and said primary piston; differential cylinder-piston means formed by said primary piston and including a differential cylinder having two working chambers; hydraulic fluid control means; and conduit means for communicating said two displacement chambers and said further working chamber of said primary cylinder and said two working chambers of said differential cylinder with said hydraulic fluid control means.

3. A cylinder-piston unit as set forth in claim 2, wherein said conduit means includes conduits that temporarily communicate a respective one of said displacement chambers of said primary cylinder with a respective working chamber of said differential cylinder via said hydraulic fluid control means.

* * * * *